US009408244B2

(12) United States Patent
Ji

(10) Patent No.: US 9,408,244 B2
(45) Date of Patent: Aug. 2, 2016

(54) MULTIMEDIA TERMINAL, CONTROL METHOD THEREOF, AND RECORDING MEDIUM

(71) Applicant: Hyundai Motor Company, Seoul (KR)

(72) Inventor: Myoung-Kyoung Ji, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/791,448

(22) Filed: Jul. 5, 2015

(65) Prior Publication Data
US 2016/0174275 A1 Jun. 16, 2016

(30) Foreign Application Priority Data

Dec. 11, 2014 (KR) ........................ 10-2014-0178328

(51) Int. Cl.
*H04W 4/00* (2009.01)
*H04W 76/02* (2009.01)
*H04W 24/02* (2009.01)

(52) U.S. Cl.
CPC ............ *H04W 76/023* (2013.01); *H04W 24/02* (2013.01)

(58) Field of Classification Search
CPC ... H04W 84/045; H04W 12/06; H04W 80/04; H04W 88/06; H04W 88/18
USPC ..................................................... 455/422.1
See application file for complete search history.

(56) References Cited

U.S. PATENT DOCUMENTS

| 2009/0093249 | A1* | 4/2009 | Zhu ........................ H04W 8/06 455/433 |
| 2013/0324191 | A1 | 12/2013 | Chen |
| 2014/0376461 | A1* | 12/2014 | Park ..................... H04W 16/14 370/329 |
| 2015/0103744 | A1* | 4/2015 | Sun ....................... H04W 60/04 370/328 |
| 2015/0230063 | A1* | 8/2015 | Chandramouli ...... H04W 4/005 455/466 |
| 2016/0007240 | A1* | 1/2016 | Belghoul .......... H04W 36/0022 370/331 |

FOREIGN PATENT DOCUMENTS

| CN | 202918410 U | 5/2013 |
| CN | 202979024 U | 6/2013 |
| KR | 10-2013-0023415 A | 3/2013 |
| KR | 10-2013-0137491 A | 12/2013 |
| KR | 10-2014-0067518 A | 6/2014 |

* cited by examiner

*Primary Examiner* — Don N Vo
(74) *Attorney, Agent, or Firm* — Mintz Levin Cohn Ferris Glovsky and Popeo, P.C.; Peter F. Corless

(57) ABSTRACT

A control method for a multimedia terminal includes: establishing a connection to a mobile terminal; performing communication with the mobile terminal via the connection; transmitting a message to the mobile terminal to determine whether the mobile terminal supports a first mode; and determining whether the mobile terminal supports the first mode or supports a second mode different from the first mode based on terminal identification (ID) information transmitted from the mobile terminal.

20 Claims, 4 Drawing Sheets

MULTIMEDIA TERMINAL, CONTROL METHOD THEREOF, AND RECORDING MEDIUM

CROSS-REFERENCE TO RELATED APPLICATION

This application claims priority to and the benefit of Korean Patent Application No. 10-2014-0178328, filed on Dec. 11, 2014, which is hereby incorporated by reference as if fully set forth herein.

BACKGROUND

1. Technical Field

The present disclosure relates generally to a multimedia terminal, a control method thereof, and a recording medium and, more particularly, to a multimedia terminal for improved user convenience, a control method thereof, and a recording medium.

2. Discussion of the Related Art

Recent developments of electronic control technology enable a variety of vehicle devices, which have conventionally been mechanically operated, to be electrically driven for improved driver convenience, safety, and the like. For instance, many vehicles include a multimedia terminal that provides functionality relating to audio, video, and navigation (i.e., AVN terminal). In addition, the multimedia terminal may communicate with a telematics unit via controller area network (CAN) communication, or may be integrally equipped with a telematics unit. The multimedia terminal may also perform wired/wireless communication with appliances. For example, the multimedia terminal may communicate with appliances via universal serial bus (USB), Bluetooth, or the like.

In addition, connectivity technology for interworking between an in-vehicle multimedia terminal and a mobile terminal (e.g., a smartphone) is continuously developing. As an example, conventional connectivity technology provided in a framework form to the OS, rather than requiring an application to be installed on an operating system (OS) of a mobile terminal. Examples of such connectivity technology include Apple CarPlay which is included, in a framework form, in Apple's iOS, as well as Google Android Auto which is included, in a framework form, in Google's Android OS.

Accordingly, there is a need to develop technology to perform communication via a connection between multimedia and a mobile terminal by rapidly determining a state of the mobile terminal at the time of communication connection.

SUMMARY OF THE DISCLOSURE

The present disclosure is directed to a multimedia terminal, a control method thereof, and a recording medium that substantially obviate one or more problems due to limitations and disadvantages of the related art. One object of the present disclosure is to provide a multimedia terminal including different connectivity technologies based on different operating systems (OS) and frameworks. Another object of the present disclosure is to provide a multimedia terminal that determines types of connectivity devices using different operating systems (OS) simultaneously with connection of the devices to the multimedia terminal.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, the present disclosure provides a control method for a multimedia terminal including: establishing a connection to a mobile terminal; performing communication with the mobile terminal via the connection; transmitting a message to the mobile terminal to determine whether the mobile terminal supports a first mode; and determining whether the mobile terminal supports the first mode or supports a second mode different from the first mode based on terminal identification (ID) information transmitted from the mobile terminal.

The control method may further include transmitting a role switching request to the mobile terminal for role switching to allow the mobile terminal to execute a first function or to execute a second function, upon determining that the mobile terminal supports the second mode.

The control method may further include executing the first function upon success of the role switching.

The control method may further include executing the second function upon failure of the role switching.

The control method may further include requesting the mobile terminal to execute a third function upon determining that the mobile terminal supports the first mode.

The control method may further include awaiting data transmission to and reception from the mobile terminal when the mobile terminal does not support the first mode or the second mode, and the mobile terminal is a storage terminal.

The multimedia terminal may be set to a charge mode when the mobile terminal does not support the first mode or the second mode, and the mobile terminal is not the storage terminal.

The establishing of the connection may include establishing a wired connection or a wireless connection to the mobile terminal.

The establishing of the connection may include establishing the connection to the mobile terminal via universal serial bus (USB), Wi-Fi, or Bluetooth.

The terminal ID information may include a vendor ID and a product ID of the mobile terminal.

Furthermore, according to embodiments of the present disclosure, a multimedia terminal includes: an interface unit configured to establish a connection to a mobile terminal and perform communication with the mobile terminal via the connection; and a controller configured to transmit a message via the interface unit to the mobile terminal to determine whether the mobile terminal supports a first mode and to determine whether the mobile terminal supports the first mode or supports a second mode different from the first mode based on terminal identification (ID) information transmitted from the mobile terminal.

The controller may be further configured to transmit a role switching request to the mobile terminal for role switching to allow the mobile terminal to execute a first function or to execute a second function, upon determining that the mobile terminal supports the second mode.

The controller may be further configured to execute the first function upon success of the role switching.

The controller may be further configured to execute the second function upon failure of the role switching.

The controller may be further configured to request the mobile terminal to execute a third function upon determining that the mobile terminal supports the first mode.

The controller may be further configured to await data transmission to and reception from the mobile terminal when the mobile terminal does not support the first mode or the second mode, and the mobile terminal is a storage terminal.

The controller may be further configured to set the multimedia terminal to a charge mode when the mobile terminal does not support the first mode or the second mode, and the mobile terminal is not the storage terminal.

The controller may be further configured to establish a wired connection or a wireless connection to the mobile terminal.

The controller may be further configured to establish the connection to the mobile terminal via USB, Wi-Fi, or Bluetooth.

The terminal ID information may include a vendor ID and a product ID of the mobile terminal.

Furthermore, according to embodiments of the present disclosure, a non-transitory computer readable medium containing program instructions for performing a control method for a multimedia terminal includes: program instructions that establish a connection to a mobile terminal; program instructions that perform communication with the mobile terminal via the connection; program instructions that transmit a message to the mobile terminal to determine whether the mobile terminal supports a first mode; and program instructions that determine whether the mobile terminal supports the first mode or supports a second mode different from the first mode based on terminal identification (ID) information transmitted from the mobile terminal.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Figure 1:
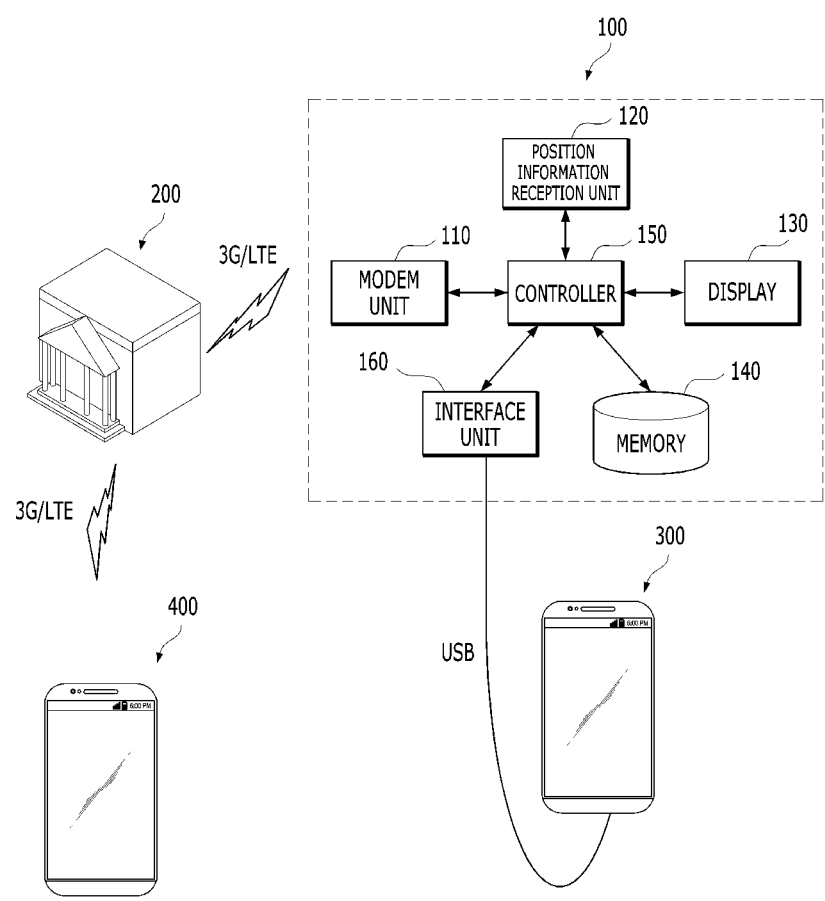
FIG. 1 is a block diagram of a multimedia terminal according to embodiments of the present disclosure.

Hereinafter, reference will now be made in detail to the embodiments of the present disclosure, examples of which are illustrated in the accompanying drawings. In the drawings, the same or similar elements are denoted by the same reference numerals even though they are depicted in different drawings, and a detailed description of the same or similar elements will be omitted. The suffixes "module" and "unit" of elements herein are used for convenience of description and thus can be used interchangeably and do not have any distinguishable meanings or functions.

In addition, in the following description of the embodiments disclosed herein, a detailed description of related known technologies will be omitted when it may make the subject matter of the embodiments disclosed herein rather unclear. In addition, the accompanying drawings have been made only for a better understanding of the embodiments disclosed herein and are not intended to limit technical ideas disclosed herein, and it should be understood that the accompanying drawings are intended to encompass all modifications, equivalents and substitutions included in the sprit and scope of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The terms including "first," "second," and the like may be used to describe various elements, but the elements are not limited by the terms. The terms, if any, are used for distinguishing between one element and other elements.

It will be understood that when one element is referred to as being "connected to" or "accessed by" another element, one element may be "connected to" or "accessed by" another element via a further element although one element may be directly connected to or directly accessed by another element. On the other hand, it will be understood that when one element is referred to as being "directly connected to" or "directly accessed by" another element, there is no component between the mentioned elements. The singular forms are intended to include the plural forms as well, unless the context clearly indicates otherwise.

The term "comprises" or "has" described herein should be interpreted not to exclude presence or addition possibility of characteristics, numbers, steps, operations, constituent elements, parts or combinations thereof described in the specification but to designate presence of one or more other characteristics, numbers, steps, operations, constituent elements, parts or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to the disclosed embodiments, FIG. 1 is a block diagram of a multimedia terminal according to embodiments of the present disclosure.

As shown in FIG. 1, the multimedia terminal, designated by reference numeral 100, may perform communication with a telematics center 200. The multimedia terminal 100 may include a modem unit 110, a position information reception unit 120, a display 130, a memory 140, a controller 150, and an interface unit 160.

While the multimedia terminal 100 is described herein as including the modem unit 110 and the position information reception unit 120, in some embodiments, a telematics unit (not shown) including a modem and the position information reception unit 120 may be separate from each other. In this case, the telematics unit (not shown) and the position information reception unit 120 may communicate with each other via in-vehicle communication, such as controller area network (CAN) communication or media oriented systems transport (MOST) communication. In addition, the multimedia terminal 100 as described herein may include a different number of components than the aforementioned components.

The multimedia terminal 100 generally includes the display 130 disposed at a front interior region of a vehicle. In addition, the multimedia terminal 100 provides audio, video, and navigation functions.

The modem unit 110 may include one or more modules to enable wireless communication between the multimedia terminal 100 and a wireless communication system, between the multimedia terminal 100 and another telematics terminal, or between the multimedia terminal 100 and an external center. In addition, the modem unit 110 may include one or more modules to connect the multimedia terminal 100 to one or more networks. While the modem unit 110 and the position information reception unit 120 have been described separately herein, in some embodiments, the modem unit 110 and the position information reception unit 120 may be incorporated in a telematics unit (not shown).

The modem unit 110 may perform communication with the telematics center 200. Generally, the modem unit 110 may perform communication with the telematics center 200 using wireless communication. The modem unit 110 may transmit and receive radio signals to and from at least one of a base station, an external terminal, and the telematics center 200 via a mobile communication network that is constructed according to technical standards for mobile communication or communication methods (e.g., global system for mobile communication (GSM), code division multi access (CDMA), code division multi access 2000 (CDMA2000), enhanced voice-data optimized or enhanced voice-data only (EV-DO), wide-band CDMA (WCDMA), high speed downlink packet access (HSDPA), high speed uplink packet access (HSUPA), long term evolution (LTE), long term evolution-advanced (LTE-A), and the like). The radio signals may include various types of data based on transmission/reception of voice call signals, video call signals, and letters/multimedia messages.

The position information reception unit 120 serves to acquire a position (i.e., current position) of the multimedia terminal 100. For example, a position of the multimedia terminal 100 may be acquired as the position information reception unit 120 receives singles transmitted from GPS satellites. Meanwhile, the multimedia terminal 100 may perform Wi-Fi communication, Bluetooth communication, Wi-Fi direct communication, or the like.

The display 130 may include at least one selected from among a liquid crystal display (LCD), a thin film transistor-liquid crystal display (TFT-LCD), an organic light emitting diode (OLED), a flexible display, a three-dimensional (3D) display, e-ink display, and the like. The display 130 may include a touch sensor to sense a touch to the display 130 so as to receive a control command in a touch manner. As such, upon occurrence of a touch to the display 130, the touch sensor may sense the touch and the controller 150 may generate a control command corresponding to the touch. Content input via touch may be letters or numerals, or menu items that may be indicated or designated in various modes.

The memory 140 stores data to assist various functions of the multimedia terminal 100. The memory 140 may store a number of applications that are driven in the multimedia terminal 100, and data and commands for operation of the multimedia terminal 100. At least some applications may be downloaded from an external center via wireless communication. In addition, at least some applications may be preinstalled in the multimedia terminal 100 for basic functions of the multimedia terminal 100. Meanwhile, the applications may be stored in the memory 140 and installed in the multimedia terminal 100 so as to be driven by the controller 150 to perform operation (i.e., functions) of the multimedia terminal 100.

The memory 140 may store programs to operate the controller 150, and temporarily store input/output data (e.g., a phonebook, messages, still images, moving images, and the like). The memory 140 may store data related to various patterns of vibrations and sound output upon input of a touch to a touchscreen. The memory 140 may include at least one storage medium selected from among a flash memory type memory, a hard disk type memory, a solid state disk (SSD) type memory, a silicon disk drive (SDD) type memory, a multimedia card micro type memory, a card type memory (e.g., an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. The multimedia terminal 100 may be operated in connection with a web storage that performs a storage function of the memory 140 in the Internet.

The interface unit 160 may perform communication with an external mobile terminal 300. The interface unit 160 may include a keyboard or a touch panel that enables input of a user, and provide USB communication with the external mobile terminal 300. In addition, the interface unit 160 may be connected to the external mobile terminal 300 via Bluetooth communication.

The controller 150 typically controls general operations of the multimedia terminal 100 in addition to operations related to the applications. The controller 150 may process signals, data, and information input or output via the aforementioned components, or drive applications stored in the memory 140, thereby providing or processing information or functions suitable for a user. The controller 150 may receive current position information of a telematics terminal via the position information reception unit 120. The current position information may be acquired via GPS reception.

Meanwhile, the telematics center 200 may perform communication with a mobile terminal 400 (e.g., a 3G/LTE terminal). The telematics sensor 200 may transmit information received from the mobile terminal 400 to the multimedia terminal 100.

Figure 2:
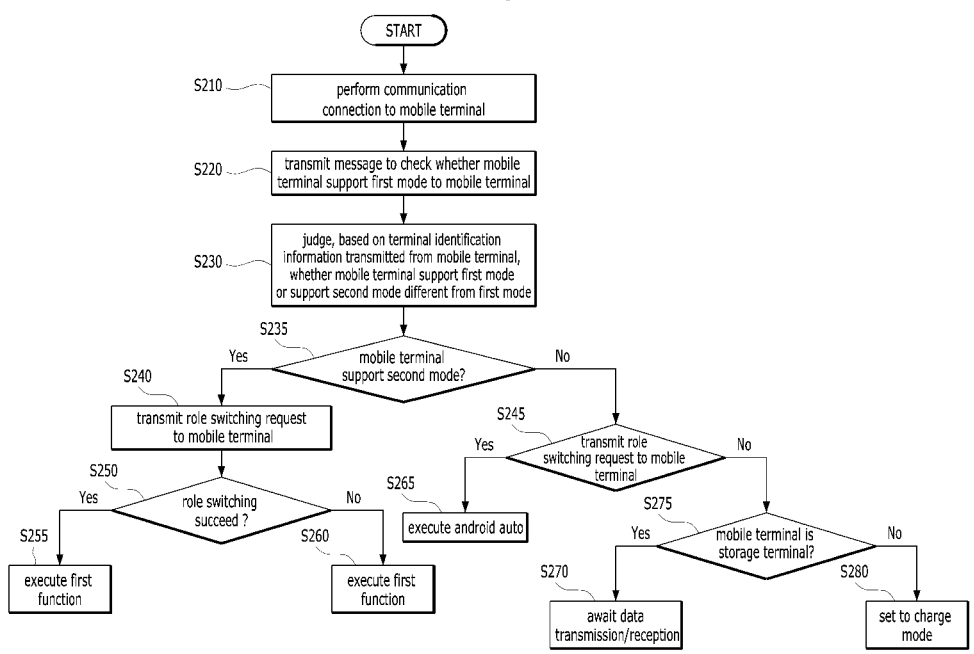
FIG. 2 is a sequence view showing a control method of a multimedia terminal according to embodiments of the present disclosure.

FIG. 2 is a sequence view of a control method of a multimedia terminal according to an embodiment of the present disclosure.

First, the controller 150 controls the interface unit 160 to perform communication connection to the mobile terminal 300 through the interface unit 160 (S210). The controller 150 may communicate with the mobile terminal 300 via wired communication, such as USB or serial communication, and may communicate with the mobile terminal 300 via wireless communication, such as Bluetooth, Wi-Fi, or Wi-Fi direct communication. Thereby, the controller 150 may detect the mobile terminal 300 through the interface unit 160.

Next, the controller 150 transmits a message to determine whether the mobile terminal 300 supports a first mode to the mobile terminal 300 (S220). The first mode refers to Accessory mode of Android OS. In addition, the message to determine whether the mobile terminal 300 supports the first mode is an Accessory mode version request. In the Accessory mode, the multimedia terminal is Accessory from the point of view of the mobile terminal 300.

Hereinafter, the reason why the controller 150 transmits the Accessory mode version request to the mobile terminal 300 in the present step will be described. The controller 150 determines whether the mobile terminal 300 supports the Accessory mode based on a vendor ID and a product ID received from the mobile terminal 300. For example, when the vendor ID is 0x18D1 and the product ID is 0x2D00 or 0x2D01, the controller 150 determines that the mobile terminal 300 supports the Accessory mode. However, when the mobile terminal 300 is not executed in the Accessory mode although it supports the Accessory mode, the vendor ID or the product ID may have a different value than the above value. At this time, the controller 150 may transmit an Accessory mode version request to the mobile terminal 300 to determine the vendor ID and the product ID of the mobile terminal 300.

In addition, even when the mobile terminal 300 runs iOS, the controller 150 may determine, based on the vendor ID and the product ID, that the mobile terminal 300 supports iOS. For example, when the vendor ID is 0x05AC and the product ID is 0x12NN, the controller 150 may determine that the mobile terminal 300 runs iOS.

As described above, by performing step S220 prior to receiving the vendor ID and the product ID of the mobile terminal 300, the controller 150 may rapidly determine whether the mobile terminal 300 supports the Accessory mode or an iOS mode (i.e., a second mode). In this way, improved user convenience and device utility may be anticipated.

Thereafter, the controller 150 determines, based on terminal identification information transmitted from the mobile terminal 300, whether the mobile terminal 300 supports the first mode (e.g., Accessory mode) or the second mode (iOS mode) (S230). The terminal identification information may be the vendor ID and the product ID of the mobile terminal 300.

Thereafter, upon determining based on the terminal identification information that the mobile terminal 300 supports the second mode (e.g., iOS mode) (S235), the controller 150 transmits a role switching request for role switching to the mobile terminal (S240). When the mobile terminal 300 supports the second mode (e.g., iOS mode), the mobile terminal 300, starting from iOS version 7.1, supports Apple Accessory Protocol 2 (iAP2) for a CarPlay function and Apple Accessory Protocol 1 (iAP1) for an iPod function.

While the controller 150 supports both iAP1 and iAP2 because iAP1 and iAP2 are different protocols, the controller 150 may provide one protocol at a time. Thus, the controller 150 must select one of iAP1 and iAP2. That is, the controller 150 must receive a CarPlay service provided by iAP2, or must receive an iPod service provided by iAP1. The controller 150 cannot simultaneously receive the two services from the mobile terminal 300.

To this end, the controller 150 may transmit a role switching request for role switching as described above to the mobile terminal 300. At this time, in a case in which the mobile terminal 300 supports iAP2 to provide a CarPlay service, role switching may succeed (S250). On the other hand, in a case in which the mobile terminal 300 supports only iAP1, role switching fails (S250). The controller 150 may execute a first function (e.g., CarPlay function) upon success of role switching (S250), and execute a second function (e.g., iPod function) upon failure of role switching.

Meanwhile, upon determining that the mobile terminal 300 does not support the second mode (e.g., iOS mode) (S235), the controller 150 determines whether the mobile terminal 300 supports the first mode (e.g., Accessory mode) (S245). The controller 150 asks the mobile terminal 300 whether the mobile terminal 300 supports Android Auto upon determining that the mobile terminal 300 supports the Accessory mode, and executes Android Auto upon receiving a message notifying that the mobile terminal 300 can support Android Auto. Android Auto is a function corresponding to CarPlay of iOS.

When the mobile terminal 300 does not support the first mode and the second mode, the controller 150 may determine a USB interface descriptor. The controller 150 awaits data transmission/reception in a case in which the mobile terminal 300 is a large capacity storage terminal (e.g., Class code of which is 9) (S270).

When the mobile terminal 300 does not support the first mode and the second mode and the mobile terminal is not the storage terminal, the multimedia terminal may be set to a charge mode (S280).

Figure 3:
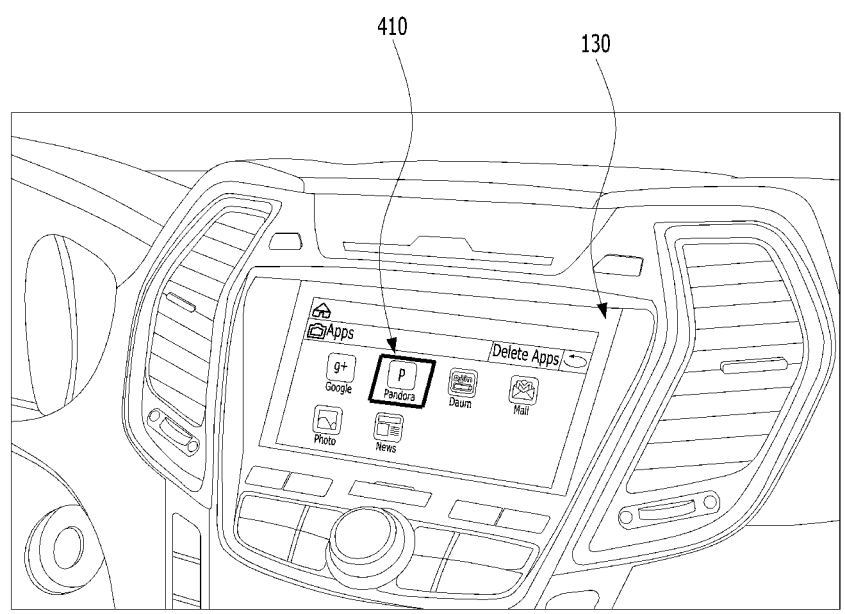
FIG. 3 is a view showing a multimedia terminal upon execution of an iPod function in a second mode according to embodiments of the present disclosure.

FIG. 3 is a view showing the multimedia terminal upon execution of an iPod function in the second mode according to embodiments of the present disclosure.

The controller 150 provides a list of applications that are currently provided by iAP1. The controller 150 may display items for provision of applications, such as Pandora 410, aha Radio, SNS, and so forth.

Figure 4:
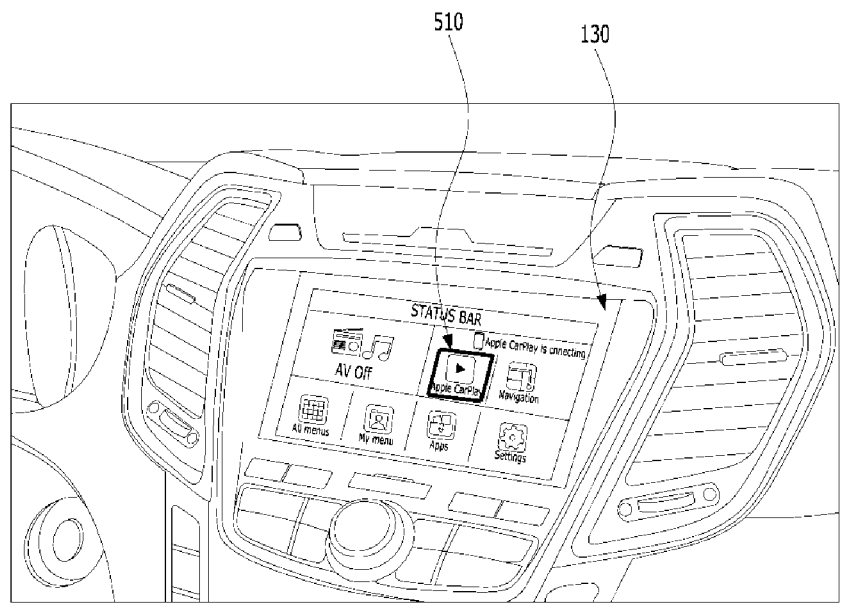
FIG. 4 is a view showing a multimedia terminal upon execution of a CarPlay function in a second mode according to embodiments of the present disclosure.

FIG. 4 is a view showing the multimedia terminal upon execution of a CarPlay function in the second mode according to embodiments of the present disclosure.

The controller 150 may display items for provision of Apple CarPlay 510 and a navigation service. A screen displayed on the multimedia terminal 100 may be directly displayed on the mobile terminal 300. Meanwhile, an AVN 4.x terminal supports the following functions via USB connection. More specifically, the terminal supports Accessory mode and a conventional iPod music service function upon connection of a device such as iPod touch that does not support a USB media function through a large capacity USB storage medium, a phone/music/navigation service function via connection of an iPhone that supports Apple CarPlay, a phone/music/navigation service function via connection of an Android phone that supports Goggle Android Auto, and a CarPlay function and supports iPod OS, but functions to operate only in a charge mode upon connection of a smartphone (e.g., LG-G2 smartphone) that does not support Android Auto.

Meanwhile, in a computer readable recording medium including a program to execute the control method of a multimedia terminal according to embodiments of the present disclosure, the control method may include performing communication connection to a mobile terminal, transmitting a message to determine whether the mobile terminal supports a first mode to the mobile terminal, and determining based on terminal identification information transmitted from the mobile terminal whether the mobile terminal supports the first mode or supports a second mode different from the first mode.

Accordingly, the above detailed description is not intended to be construed to limit the present disclosure in all aspects and be considered by way of example. The scope of the present disclosure should be determined by reasonable interpretation of the accompanying claims and all equivalent modifications made without departing from the present disclosure should be included in the following claims.

As is apparent from the above description, according to various embodiments of the present disclosure, improved user convenience and device utility may be accomplished by providing a multimedia terminal including different connectivity technologies based on different operating systems (OS) and frameworks. In addition, improved user convenience and device utility may be accomplished by providing a multimedia terminal that determines types of connectivity devices using different operating systems (OS) simultaneously with connection of the devices to the multimedia terminal.

It will be appreciated by persons skilled in the art that the effects that can be achieved through the present disclosure are not limited to what has been particularly described hereinabove and other advantages of the present disclosure will be more clearly understood from the above detailed description. Furthermore, various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A control method for a multimedia terminal mounted in a vehicle, the method comprising:
   establishing a connection to a mobile terminal operating an operating system (OS);
   performing communication with the mobile terminal via the connection;
   transmitting a message to the mobile terminal to determine whether the mobile terminal supports a first mode related to a first OS operable on the mobile terminal; and
   determining whether the mobile terminal supports the first mode or supports a second mode related to a second OS operable on the mobile terminal different from the first mode based on terminal identification (ID) information transmitted from the mobile terminal.

2. The control method according to claim 1, further comprising transmitting a role switching request to the mobile terminal for role switching to allow the mobile terminal to execute a first function or to execute a second function, upon determining that the mobile terminal supports the second mode.

3. The control method according to claim 2, further comprising executing the first function upon success of the role switching.

4. The control method according to claim 2, further comprising executing the second function upon failure of the role switching.

5. The control method according to claim 2, further comprising requesting the mobile terminal to execute a third function upon determining that the mobile terminal supports the first mode.

6. The control method according to claim 1, further comprising awaiting data transmission to and reception from the mobile terminal when the mobile terminal does not support the first mode or the second mode, and the mobile terminal is a storage terminal.

7. The control method according to claim 6, wherein the multimedia terminal is set to a charge mode when the mobile terminal does not support the first mode or the second mode, and the mobile terminal is not the storage terminal.

8. The control method according to claim 1, wherein the establishing of the connection comprises establishing a wired connection or a wireless connection to the mobile terminal.

9. The control method according to claim 1, wherein the terminal ID information includes a vendor ID and a product ID of the mobile terminal.

10. A multimedia terminal mounted in a vehicle, comprising:
    a memory configured to store program instructions; and
    a processor configured to execute the stored program instructions, causing the processor to establish a connection to a mobile terminal operating an operating system (OS), to transmit a message via the connection to the mobile terminal to determine whether the mobile terminal supports a first mode related to a first OS operable on the mobile terminal, and to determine whether the mobile terminal supports the first mode or supports a second mode related to a second OS operable on the mobile terminal different from the first mode based on terminal identification (ID) information transmitted from the mobile terminal.

11. The multimedia terminal according to claim 10, wherein the processor transmits a role switching request to the mobile terminal for role switching to allow the mobile terminal to execute a first function or to execute a second function, upon determining that the mobile terminal supports the second mode.

12. The multimedia terminal according to claim 11, wherein the processor executes the first function upon success of the role switching.

13. The multimedia terminal according to claim 11, wherein the processor executes the second function upon failure of the role switching.

14. The multimedia terminal according to claim 11, wherein the processor requests the mobile terminal to execute a third function upon determining that the mobile terminal supports the first mode.

15. The multimedia terminal according to claim 10, wherein the processor awaits data transmission to and reception from the mobile terminal when the mobile terminal does not support the first mode or the second mode, and the mobile terminal is a storage terminal.

16. The multimedia terminal according to claim 15, wherein the processor sets the multimedia terminal to a charge mode when the mobile terminal does not support the first mode or the second mode, and the mobile terminal is not the storage terminal.

17. The multimedia terminal according to claim 10, wherein the processor establishes a wired connection or a wireless connection to the mobile terminal.

18. The multimedia terminal according to claim 10, wherein the processor establishes the connection to the mobile terminal via USB, Wi-Fi, or Bluetooth.

19. The multimedia terminal according to claim 10, wherein the terminal ID information includes a vendor ID and a product ID of the mobile terminal.

20. A non-transitory computer readable medium containing program instructions for performing a control method for a multimedia terminal mounted in a vehicle, the computer readable medium comprising:
   program instructions that establish a connection to a mobile terminal operating an operating system (OS);
   program instructions that perform communication with the mobile terminal via the connection;
   program instructions that transmit a message to the mobile terminal to determine whether the mobile terminal supports a first mode related to a first OS operable on the mobile terminal; and
   program instructions that determine whether the mobile terminal supports the first mode or supports a second mode related to a second OS operable on the mobile terminal different from the first mode based on terminal identification (ID) information transmitted from the mobile terminal.

* * * * *